(No Model.)
E. M. WHEELER & S. Z. HALL.
COTTON GIN.
No. 343,934. Patented June 15, 1886.
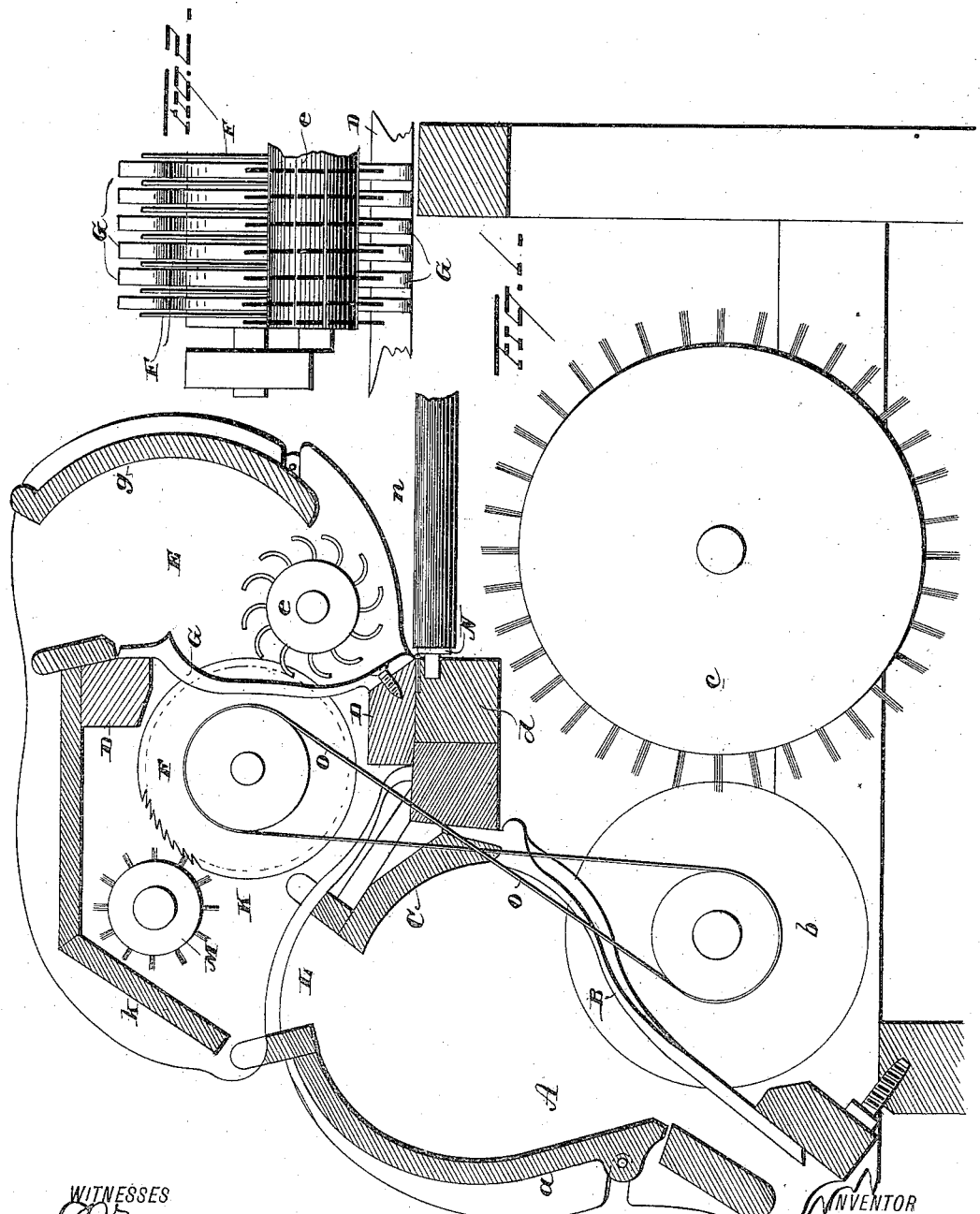
WITNESSES
INVENTOR

UNITED STATES PATENT OFFICE.

EUGENE M. WHEELER AND SAMUEL Z. HALL, OF LITTLE ROCK, ARK.

COTTON-GIN.

SPECIFICATION forming part of Letters Patent No. 343,934, dated June 15, 1886.

Application filed June 14, 1884. Renewed April 29, 1886. Serial No. 200,626. (No model.)

*To all whom it may concern:*

Be it known that we, EUGENE M. WHEELER and SAMUEL Z. HALL, of Little Rock, in the county of Pulaski and State of Arkansas, have invented certain new and useful Improvements in Cotton-Gins; and we do hereby declare the following to be a full, clear, and exact description of the invention, such as will enable others skilled in the art to which it appertains to make and use the same.

Our invention relates to an improvement in cotton-gins.

It is customary for the cotton-growers to gather the later portion of their crops in a trashy condition. The leaves and bolls having been killed by the frost, the hulls, bolls, leaves and any other trash which happen to be mingled with the cotton are gathered in a mass, and require to be passed through a hulling process to enable the seller to obtain a fair price for the cotton.

Hitherto the hullers have formed a part of the cotton-gin proper, and it has been common for the large growers to have two gins, one without a hulling attachment for ginning the first picking, and one with the huller attached for ginning the last picking; and, furthermore, in the hullers hitherto constructed, the hulls, bolls, trash, &c., have been discharged along with the ginned seed. These hullers are found objectionable on account of the expense necessary to keep two gins on hand, and on account of the labor required to separate the ginned seed from the hulls, bolls, and trash discharged therewith.

The object of our present invention is to provide a hulling apparatus which may be readily attached to any of the saw-gins in common use; a further object being to construct a hulling apparatus which shall discharge the hulls, bolls, and trash separately from the seed; a further object being to provide a hulling apparatus which shall be effective, durable, and inexpensive.

With these ends in view our invention consists in certain features of construction and combinations of parts, as will be hereinafter described, and pointed out in the claims.

In the accompanying drawings, Figure 1 is an end view of our improved device attached to a saw-gin, the end boards being removed; and Fig. 2 is a rear view, the breast of the huller being removed.

A represents the roll-box of an ordinary gin; *a*, the front of the box; B, the ribs; *b*, the saws; C, the cove, and *c* the brush.

Our improved huller is mounted in a suitable frame, D, and is adapted to be hinged to the portion *d* of the main frame of the gin-stand.

E represents the roll-box of the huller, provided near the bottom with a spiked roller, *e*. The teeth on the roller *e* are preferably constructed claw-shaped, for the purpose of securing a better hold on the trash and carrying it within reach of the saws F. The front portion of the roll-box E is provided with a series of ribs, G, similar in construction to those in the gin proper, but set sufficiently far apart to allow the seed and lint to pass through, but not far enough to allow the hulls, bolls, leaves, &c., to pass. The rear of the box E is provided with an adjustable breast, *g*, for increasing or lessening the feed, as desired. A set of saws, F, provided with coarser teeth than the saws in the gin proper, but otherwise similar, pass between the ribs G and extend into the box E, preferably lapping a short distance past the ends of the teeth on the spiked roller *e*. The saws F are situated in a box, *k*, which is provided with an upper casing, *k*, shaped to guide the seed, with its lint, into the feed L of the roll box A. A brush, M, is situated in the box K in contact with the teeth of the saws H, which removes the lint from the saws, and causes a ready discharge of the same into the box A; or, instead of a brush, a spiked roller or cylinder might be used to remove the lint from the saws. A set of rollers, N, is journaled in the frame of the huller or frame of the gin proper, as may be found most convenient, around which an endless belt or apron, *n*, passes. The endless belt *n* is situated beneath the roll-box E of the huller, and receives the hulls, bolls, leaves, &c., as they are separated from the seed and lint, and conducts them off to one end of the machine, or to any suitable depository. The saws, spike-roller, brush, and endless belt of the huller are driven by a belt, O, connecting a pulley on the saw-shaft of the gin proper with a pulley on the saw-shaft of the huller; or the huller may be driven from a counter-shaft. The motion of the saw-shaft of the huller may be communicated to the spiked roller-brush and endless-belt trash-carrier by gear, belts, sprocket-chains, or whatever device is found most convenient.

From the above it will be seen that our improved huller may be constructed at slight expense, so that it may be within the reach of the mass of cotton-growers, that it can be applied with facility to all the saw-gins in common use, and that it effectually provides for separating the trash from the lint and seed.

Having fully described our invention, what we claim as new, and desire to secure by Letters Patent, is—

1. The combination, with a cotton-gin, of an independent hulling attachment located above the gin and removably attached to said gin, the said attachment adapted to receive the seed-cotton, and remove the trash therefrom, and discharge it into the roll-box of the gin.

2. The combination, with a cotton-gin, of an independent hulling attachment removably attached to said gin, and an endless belt located under the open end of the roll-box of the hulling attachment and over the gin, and adapted to receive and discharge the hulls as they fall from the huller.

3. The combination, with a cotton-gin, of a hulling attachment adapted to discharge the seed-cotton into the roll-box of the gin, and consisting, essentially, of a roll-box, a feed-roller journaled in the lower portion of the roll-box, a series of saws, ribs, and a brush, and a conveyer located below the lower end of the roll-box of the hopper for receiving and discharging the bolls and trash, substantially as set forth.

In testimony whereof we have signed this specification in the presence of two subscribing witnesses.

EUGENE M. WHEELER.
SAMUEL Z. HALL.

Witnesses:
W. B. WARE,
WILLIAM THOMPSON.